United States Patent Office 3,138,172
Patented June 23, 1964

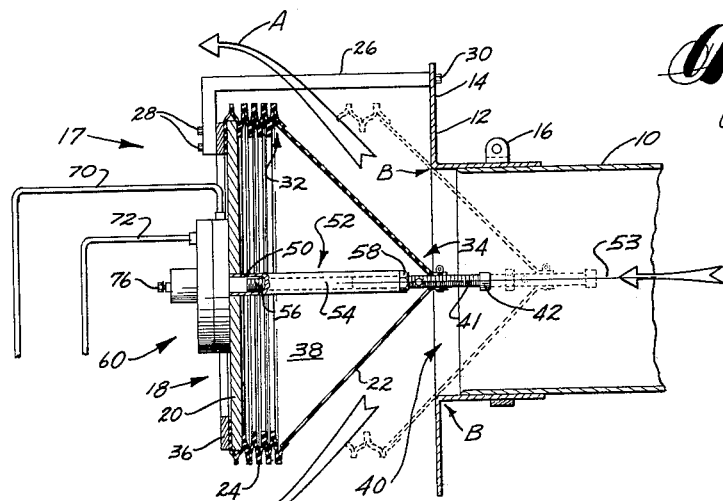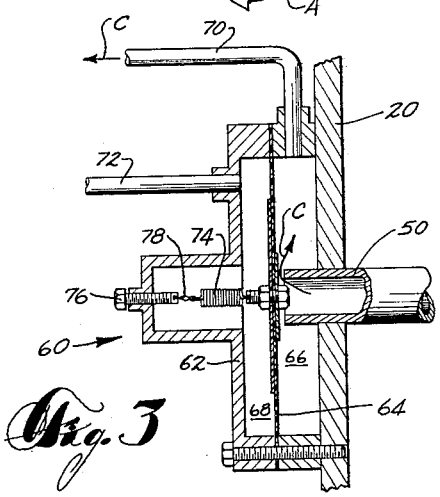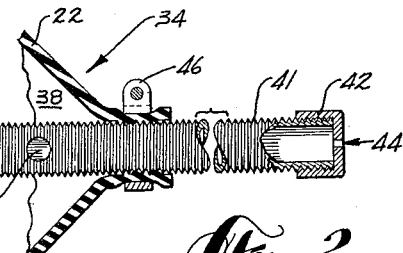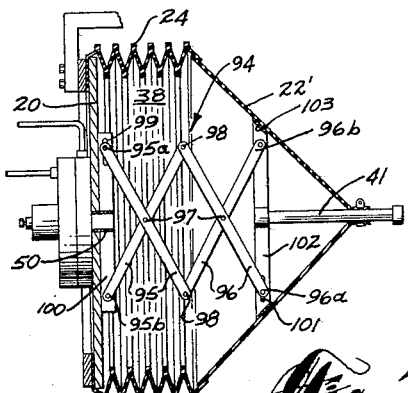
INVENTOR.
ARTHUR P. JENTOFT
BY George E. Manias
AGENT

3,138,172
CHAMBER WITH EXTENSIBLE PLUG VALVE
ASSEMBLY
Arthur P. Jentoft, Wexford, Pa., assignor to
H. H. Robertson Company
Filed Oct. 12, 1961, Ser. No. 144,609
6 Claims. (Cl. 137—486)

The present invention relates to a valve means for controlling the flow of gas from a conduit terminal. More particularly the present invention relates to a valve comprising an extendable plug mounted in axially aligned relation with respect to a terminal end of a conduit.

The present invention is particularly useful in the ventilating art.

According to the present invention, I provide a plug axially aligned with and normally spaced from a terminal end of a conduit. A normally collapsed, resilient bellows connects the plug to a back plate whereby the back plate, the bellows and the plug form a valve operating chamber. Inlet conduit means is provided for introducing a portion of the gas from the conduit terminal into the valve operating chamber as an operating fluid. Outlet conduit means is also provided for discharging the operating fluid. The pressure of the operating fluid positions the plug with respect to the conduit terminal and thereby controls the discharge of gas from the conduit terminal. Bleed control means is also provided for controlling the rate of discharge of the operating fluid from the valve operating chamber.

Valves of the present invention are conveniently controlled by the gas flowing through the conduit terminal. Relatively low gas pressures are required to operate the present valve. The present valve is easily assembled, installed and dismantled and requires no delicate alignment adjustments which has been one problem associated with the terminal valves of the prior art. The present valve is relatively inexpensive to manufacture and maintain and provides a unitary assembly that is interchangeable with other valve assemblies of the present invention.

The primary object of this invention is to provide a valve for controlling the flow of gases which are discharged from a conduit into an enlarged chamber.

The present invention, its objects and advantages will be described by reference to the accompanying drawings in which:

FIGURE 1 is a cross-sectional illustration of a preferred embodiment of the present valve assembly;

FIGURE 2 is an elevational view, partly in cross-section, illustrating inlet conduit means of the present valve assembly;

FIGURE 3 is a cross-sectional view illustrating outlet conduit means and bleed control means of the present valve assembly;

FIGURE 4 is a cross-sectional plan view of a prior art mixer box adapted with the valve assembly of the present invention; and FIGURE 5 is a cross-sectional illustration, similar to FIGURE 1, of an alternative embodiment of the present valve assembly.

Referring to FIGURE 1, a gas conduit 10 of circular cross-section serves to convey gases such as ventilating air. The discharge of gases from the conduit 10 can be regulated by means of the terminal valve of this invention. An outlet fitting 12 has a radial flange 14 at one end and is engageable at its other end with the conduit 10. A connector strap 16 is provided to secure the outlet fitting 12 to the conduit 10.

The present valve assembly is indicated generally by the numeral 17. The extendable portion of the valve assembly 17 is generally indicated by the numeral 18 and comprises a back plate 20, a plug 22 and a bellows 24.

The back plate 20 is secured in spaced outer relation to the end of the conduit 10 by means of spaced support arms 26 extending from the back plate 20 to the radial flange 14. The support arms 26 are secured, for example, by means of bolts 28, to the back plate 20 and by means of bolts 30 to the radial flange 14. The back plate 20 preferably is formed from a metal stamping or die casting.

The plug 22 includes a base end 32 and an apex end 34 and a diminishing cross-sectional area from the base end 32 to the apex end 34, as for example, the conical configuration specifically illustrated. The plug 22 preferably is a hollow conical plug of relatively rigid materials such as stiff rubber, sheet metal or plastic materials. As shown, the plug 22 is positioned between the back plate 20 and the end of the conduit terminal 10.

The bellows 24 preferably is a normally collapsed bellows of resilient material such as rubber. The bellows 24 serves to connect the back plate 20 to the plug 22. The bellows 24 is secured at one end to the base end 32 of the plug 22, for example, by means of a suitable adhesive substance. The other end of the bellows 24 is secured to the back plate 20 by means of the bolts 28. A compression ring 36 is interposed between the ends of the support arms 26 and the end of the bellows 24 and serves to compress the end of the bellows 24 so that a seal is formed.

The back plate 20, the plug 22 and the bellows 24, as assembled, define a valve operating chamber 38. Further an annular gas passageway 40 is presented between the plug 22 and the outlet fitting 12 for discharging the gas from the conduit 10 as indicated by the arrows labeled A.

Referring to FIGURES 1 and 2, the valve assembly 17 further includes inlet conduit means, such as inlet conduit 41 which includes a cap 42 having an aperture 44 centrally therethrough. The inlet conduit 41 is secured to the apex end 34 of the plug 22 by any suitable means such as clamp fastener 46. The inlet conduit 41 is aligned with the axis of the terminal conduit 10 and extends for a short distance into the terminal conduit 10. Thus a portion of the gas in the terminal conduit 10 is communicated to the valve operating chamber 38 as an operating fluid. The operating fluid passes through the aperture 44, the inlet conduit 41 and a bleed means such as opening 48 in the inlet conduit 41. The opening 48 serves also to discharge the operating fluid from the valve operating chamber 38.

Referring to FIGURES 1 and 3, the valve assembly 17 further includes outlet conduit means such as outlet conduit 50 which extends through the back plate 20.

Referring again to FIGURE 1, the valve assembly 17 also includes an extensible alignment means 52 for maintaining the plug 22 substantially aligned with the longitudinal axis 53 of the conduit terminal 10. The extensible alignment means 52 comprises a guide shaft 54 and a guided shaft 56. The guide shaft 54 and the guided shaft 56 are extensions of the outlet conduit 50 and the inlet conduit 41 respectively. As illustrated the guided shaft 56 is telescopically engaged in the guide shaft 54. Further the guided shaft 56 is a tubular member whereby the operating fluid may pass therethrough into the outlet conduit 50.

Thus the plug 22 is urged toward the terminal conduit 10 when the pressure of the operating fluid in the valve operating chamber 38 is increased and is urged away from the terminal conduit 10 by the normally collapsed bellows 24 when the pressure of the operating fluid is decreased. If sufficient pressure is introduced in the valve operating chamber 38, the plug 22 will engage the outlet fitting 12 at B, as illustrated in phantom outline in FIGURE 1, to substantially entirely restrict the flow of gas out from the terminal conduit 10. Since the effective cross-sectional area of the plug 22 is substantially larger than the cross-sectional area of the conduit 10, a relatively low gas pressure is required to operate the valve assembly 17.

In order to limit the travel of the plug 22 in the direction of the back plate 20, a lock nut 58 is provided on the guided shaft 56 which abuts the end of the guide shaft 54 at a predetermined point thereon.

Referring again to FIGURES 1 and 3, the valve assembly 17 still further includes a bleed control means, such as pressure regulator 60 which in this instance is responsive to a pressure drop at a point downstream of the valve assembly 17. The pressure regulator 60 comprises a body 62 having a thin resilient membrane 64 which divides the body 62 into chambers 66, 68. A first sensing conduit 70 communicates with the chamber 66 and a second sensing conduit 72 communicates with the chamber 68. A coil spring element 74, positioned within the chamber 68, has one end connected to the membrane 64, and the other end connected to an adjustment screw 76 by means of a swivel element 78.

The second sensing conduit 72 communicates a pressure into the chamber 68 which pressure is higher than the pressure communicated into the chamber 66 by the first sensing conduit 70. The spring element 74 is tensioned so that its spring force plus the force created by the pressure in the chamber 66 are equal to the force created by the pressure in the chamber 68. By regulating the tension of the spring element 74 a predetermined pressure differential is chosen at which the pressure regulator 60 will control.

The operating fluid in the valve operating chamber 38 is discharged from the outlet conduit 50, and the first sensing conduit 70 as indicated by the arrows labeled C. It should be noted that a pressure differential exists across the gap between the resilient membrane 64 and the end of the conduit 50 which results in the flow of the operating fluid from the conduit 50 into the chamber 66. The discharge rate of the operating fluid is controlled, in response to deviations from the predetermined value of the pressure drop sensed by the regulator 60, by enlarging or diminishing the distance between the end of the outlet conduit 50 and the membrane 64 in response to the deviations. Hence the pressure of the operating fluid within the valve operating chamber 38, is adjusted whereby the annular gas passageway 40 is regulated to control the discharge of the gas from the terminal conduit 10.

As a specific illustration of the use of the present valve assembly 17, reference is now directed to FIGURE 4. A prior art mixer box 80, shown in cross-section, includes two inlets 81 and 82 which convey cold air and warm air respectively into the cavity of the mixer box 80. A pair of partitions 83, 84 divide the cavity into an inlet blending chamber 85, a mixing chamber 86 and a distribution chamber 87. The partition 83 separates the inlet blending chamber 85 from the mixing chamber 86 and has a plurality of directional mixing vanes 88 which create some turbulence as air passes through the partition 83 to provide a uniformly mixed stream of blended air. The partition 84 separates the mixing chamber 86 from the distribution chamber 87 and has a perforate plate 89 through which the air may experience streamline flow. Imperforate plates 90 are provided in a slideable mounting in which they may be extended or retracted to regulate the exposed cross-sectional area of the perforate plate 89 to regulate the flow of air therethrough. Exit conduits 91 are provided at the distribution chamber 87 as means for conveying the blended air to various parts of a building.

The present valve 17 is installed on the terminal end of one of the inlet conduits, as for example the cold air inlet conduit 81 and a pneumatically operated valve 92 is installed on the terminal end of the warm air inlet conduit 82. The first sensing conduit 70 extends into the distribution chamber 87 while the second sensing conduit 72 extends into the mixing chamber 86. The sensing conduits 70, 72 thus sense the pressure drop across the perforate plate 89.

The pneumatically operated valve 92 includes a sensing line 93 which conveys signals control pressure from a control element, as for example a thermostat (not shown) which is positioned within a control zone such as a room of a building which receives air via the exit conduits 91.

In operation, the volume of warm air admitted into the blending chamber 85 is controlled in response to the thermostat. The present valve means 17 controls the volume of cold air discharged into the blending chamber 85, in response to deviations from the predetermined value of the pressure drop across the perforate plate 89, to maintain a constant volume of discharge from the mixer box 80. Hence, when the volume of warm air increases, the pressure regulator senses the increased pressure drop and reduces the rate of discharge of the cold air in the manner hereinabove described. Conversely when the volume of warm air is reduced, the pressure regulator senses the reduced pressure drop and increases the rate of discharge of the cold air in the manner hereinabove described. Thus a constant volume of discharge of properly conditioned air is maintained.

An alternative embodiment of the present valve assembly is illustrated in FIGURE 5. Corresponding numerals are employed to identify corresponding parts already described.

In this embodiment the valve operating chamber 38 is defined by the back plate 20, the bellows 24 and a plug 22' which preferably comprises a hollow conical plug of thin resilient material such as rubber. In this embodiment the extensible alignment means comprises a lazy tongs assembly 94.

The lazy tongs assembly 94 is a well known contracting and expanding mechanism which comprises first and second pairs of arms 95, 96. As illustrated the arms of each pair of arms 95, 96 are pivotally secured together at their midpoints 97 and the arms of adjacent ones of the pairs of arms 95, 96 are pivotally connected at their ends 98.

The first pair of arms 95 has one arm end 95a slideably retained in a first cam slot 99 cut in one end of a plate 100 secured to the outlet conduit 50 and the other arm end 95b pivotally secured to other end of the plate 100.

The second pair of arms 96 has one arm end 96a slideably retained in a second cam slot 101 cut in one end of a second plate 102 secured to the inlet conduit 41 and the other arm end 96b pivotally secured to the other end of the second plate 102. The second plate 102 extends into engagement with a conical ring member 103 which is in supporting engagement with the plug 22'. It should be evident that the lazy tongs assembly, as herein arranged, maintains the plug 22' substantially aligned with the longitudinal axis 53 (see FIGURE 1) of the conduit terminal 10.

It should be evident from the foregoing detailed description that relatively low gas pressures are required to operate the present valve assembly, that the present valve assembly is easily assembled, installed and dismantled and requires no delicate alignment adjustments which has been one problem associated with the terminal valves of the prior art. And that the present valve assembly is relatively inexpensive to manufacture and maintain and provides a unitary assembly that is interchangeable with other valve assemblies of the present invention.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. In a gas flow regulating valve for controlling the discharge of gas from a conduit terminal into an enlarged chamber, the combination comprising:
   a back plate secured in spaced outer relation to the end of said conduit terminal,
   a plug having a base end and an apex end and having a diminishing cross-sectional area from said base end to said apex end, said plug being positioned between the said back plate and the said conduit terminal whereby an annular gas passageway is defined,
   a normally collapsed, resilient bellows having one end connected to said base end of said plug and the other end connected to said back plate whereby the said back plate, the said bellows and the said plug define a valve operating chamber,
   inlet conduit means secured to said apex end of said plug for communicating a portion of the said gas to said valve operating chamber as an operating fluid,
   outlet conduit means in said back plate for discharging the said operating fluid,
   extensible alignment means extending between the said inlet conduit means and the said outlet conduit means for maintaining the said plug substantially aligned with the longitudinal axis of the said conduit terminal, means within said enlarged chamber for sensing a pressure differential related to the flow rate of said gas from said conduit terminal, and
   bleed control means responsive to a pressure differential in said enlarged chamber for controlling the discharge rate of said operating fluid from the said outlet conduit means whereby the said annular gas passageway is regulated in accordance with deviations from a predetermined value of said pressure differential.

2. In a gas flow regulating valve for controlling the discharge of gas from a conduit terminal into an enlarged chamber, the combination comprising:
   a back plate secured in spaced outer relation to the end of said conduit terminal,
   a plug having a base end and an apex end and having a diminishing cross-sectional area from said base end to said apex end, said plug being positioned between the said back plate and the said conduit terminal whereby an annular gas passageway is defined,
   a normally collapsed, resilient bellows having one end connected to said base end of said plug and the other end connected to said back plate whereby the said back plate, the said bellows and the said plug define a valve operating chamber,
   inlet conduit means secured to said apex end of said plug for communicating a portion of the said gas to said valve operating chamber as an operating fluid.
   outlet conduit means in said back plate for discharging the said operating fluid,
   extensible alignment means extending between the said inlet conduit means and the said outlet conduit means for maintaining the said plug substantially axially aligned with the longitudinal axis of the said conduit terminal, and
   bleed control means communicating with said outlet conduit means for controlling the discharge rate of said operating fluid from said outlet conduit means.

3. In a unitary valve stem assembly having a longitudinal axis, the combination comprising:
   a back plate;
   a plug having a base end and an apex end and having a diminishing cross-sectional area from said base end to said apex end;
   a normally collapsed resilient bellows having one end secured to the said base end of said plug and the other end secured to the said back plate whereby the said back plate, the said bellows and the said plug define a valve operating chamber;
   inlet conduit means in said plug for communicating an operating fluid into the said valve operating chamber;
   outlet conduit means in said back plate for discharging the said operating fluid from the said valve operating chamber;
   extensible alignment means within the said valve operating chamber for maintaining the said plug substantially axially aligned with the said longitudinal axis; and
   bleed control means communicating with said outlet conduit means for controlling the discharge of said operating fluid whereby the said plug is positionable along the said longitudinal axis.

4. The combination of claim 3 wherein the said extensible alignment means comprises:
   a guide shaft,
   a guided shaft telescopingly engaged in the said guide shaft, and
   bleed means in one of said shafts for introducing and withdrawing the said operating fluid from the said valve operating chamber,
   said shafts being extensions of said first and second conduit means.

5. The combination of claim 3 wherein the said extensible alignment means is a lazy tongs assembly having one end secured to said inlet conduit means and the other end secured to the said outlet conduit means.

6. A unitary valve stem assembly having a longitudinal axis, comprising in combination:
   a back plate;
   a plug;
   a normally collapsed, resilient bellows having one end connected to the said back plate and the other end connected to the said plug whereby the said back plate, the said bellows and the said plug define a valve operating chamber;
   inlet conduit means for communicating an operating fluid into the said valve operating chamber;
   outlet conduit means for discharging the said operating fluid from the said valve operating chamber;
   a lazy tongs assembly connecting the said plug to the said back plate, said lazy tongs assembly maintaining the said plug substantially axially aligned with said longitudinal axis; and
   bleed control means communicating with said outlet conduit means for controlling the discharge rate of said operating fluid whereby the said plug is positionable along the said longitudinal axis.

References Cited in the file of this patent

UNITED STATES PATENTS

| | | |
|---|---|---|
| 1,508,398 | Kelly | Sept. 16, 1924 |
| 2,880,752 | Kreuttner | Apr. 7, 1959 |